US012562059B2

(12) United States Patent
Kita et al.

(10) Patent No.: US 12,562,059 B2
(45) Date of Patent: Feb. 24, 2026

(54) INFORMATION PROCESSING METHOD, INFORMATION PROCESSING DEVICE, NON-TRANSITORY COMPUTER READABLE RECORDING MEDIUM, AND METHOD FOR MANUFACTURING TRAINED MODEL

(71) Applicant: Panasonic Intellectual Property Corporation of America, Torrance, CA (US)

(72) Inventors: Atsuyoshi Kita, Osaka (JP); Tetsuji Fuchikami, Osaka (JP); Tatsumi Nagashima, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 101 days.

(21) Appl. No.: 18/408,237

(22) Filed: Jan. 9, 2024

(65) Prior Publication Data

US 2024/0144823 A1 May 2, 2024

Related U.S. Application Data

(63) Continuation of application No. PCT/JP2022/026254, filed on Jun. 30, 2022.

(30) Foreign Application Priority Data

Jul. 13, 2021 (JP) ................................. 2021-115501

(51) Int. Cl.
*G08G 1/0969* (2006.01)
*G01C 21/34* (2006.01)
(52) U.S. Cl.
CPC ....... *G08G 1/0969* (2013.01); *G01C 21/3469* (2013.01)

(58) Field of Classification Search
CPC .. G08G 1/0969; G01C 21/3469; G09B 29/10; B60L 3/00; B60L 15/20; B60L 50/60;
(Continued)

(56) References Cited

U.S. PATENT DOCUMENTS

2014/0278038 A1 9/2014 Stankoulov
2015/0198459 A1 7/2015 MacNeille et al.
(Continued)

FOREIGN PATENT DOCUMENTS

JP 2015-224871 12/2015
JP 2018-066759 4/2018
(Continued)

OTHER PUBLICATIONS

International Search Report issued in International Pat. Appl. No. PCT/JP2022/026254, dated Sep. 20, 2022, along with an English translation thereof.

(Continued)

*Primary Examiner* — Brian P Sweeney
(74) *Attorney, Agent, or Firm* — Greenblum & Bernstein, P.L.C.

(57) ABSTRACT

An information processing device performs: acquiring input data including a current location and a residual electric power amount of an electrically driven mobile vehicle; calculating, on the basis of map information, a geographical feature quantity between the current location and a plurality of locations; calculating an estimative electric power consumptive amount of the electrically driven mobile vehicle from the current location to each of the locations by inputting the geographical feature quantity into a learned model obtained by machine learning of a relationship between: a geographical feature quantity between two locations; and an electric power consumption amount having been consumed to travel between the two locations; generating, on the basis (Continued)

G3

701 401

401s(401)

702

700 of the estimative electric power consumptive amount for each of the locations and the residual electric power amount, travelable area information indicating a travelable area for the electrically driven mobile vehicle from the current location.

13 Claims, 10 Drawing Sheets

(58) Field of Classification Search
CPC . B60L 58/12; G06N 3/09; G06N 5/01; G06N 20/20
See application file for complete search history.

(56) References Cited

U.S. PATENT DOCUMENTS

| | | | |
|---|---|---|---|
| 2015/0268054 | A1 | 9/2015 | Stankoulov |
| 2015/0338225 | A1 | 11/2015 | Suzuki et al. |
| 2017/0074677 | A1 | 3/2017 | MacNeille et al. |
| 2017/0199047 | A1 | 7/2017 | Stankoulov |
| 2017/0213137 | A1 | 7/2017 | Geller |
| 2021/0138927 | A1 | 5/2021 | Maeng et al. |
| 2021/0180967 | A1 | 6/2021 | Chae et al. |

FOREIGN PATENT DOCUMENTS

| | | | |
|---|---|---|---|
| JP | 2018-072083 | | 5/2018 |
| JP | 6384876 | | 9/2018 |
| WO | 2014-034298 | | 3/2014 |
| WO | WO 2015181568 | A2 * | 12/2015 |

OTHER PUBLICATIONS

Extended European Search Report (EESR) from European Patent Office (EPO) in European Patent Appl. No. 22841969.3, dated Sep. 27, 2024.

* cited by examiner

G1

401a(401)

401s(401)

401b(401)

G2

G5

INFORMATION PROCESSING METHOD, INFORMATION PROCESSING DEVICE, NON-TRANSITORY COMPUTER READABLE RECORDING MEDIUM, AND METHOD FOR MANUFACTURING TRAINED MODEL

TECHNICAL FIELD

The present disclosure relates to a technology of representing a travelable area for an electrically driven mobile vehicle.

BACKGROUND ART

Patent Literature 1 discloses a technology of: calculating a travelable distance for a vehicle by evaluating a plurality of links extending outward from a position of the vehicle: and displaying, on the basis of a result of the calculation, a travelable area or range for the vehicle on a map image.

However, the technology of Patent Literature 1 shows calculation of the travelable area on a rule basis, and thus has a drawback of a failure in generation of travelable area information accurately indicating the travelable area.

CITATION LIST

Patent Literature

Patent Literature 1: Japanese Patent Publication No. 6384876

SUMMARY OF INVENTION

The present disclosure has been achieved to solve the drawback, and has an object of providing a technology of generating travelable area information accurately indicating a travelable area.

An information processing method according to one aspect of the present disclosure is an information processing method for an information processing device that causes a display device to display a travelable area for an electrically driven mobile vehicle. The information processing method includes: by a processor included in the information processing device, acquiring input data including a current location and a residual electric power amount of the electrically driven mobile vehicle; calculating, on the basis of map information, a geographical feature quantity between the current location and a plurality of locations; calculating an estimative electric power consumptive amount of the electrically driven mobile vehicle from the current location to each of the locations by inputting the geographical feature quantity into a learned model obtained by machine learning of a relationship between: a geographical feature quantity between two locations; and an electric power consumption amount having been consumed to travel between the two locations; generating, on the basis of the estimative electric power consumptive amount for each of the locations and the residual electric power amount, travelable area information indicating the travelable area for the electrically driven mobile vehicle from the current location; and outputting the travelable area information to the display device.

The present disclosure achieves generation of travelable area information more accurately indicating a travelable area.

DESCRIPTION OF EMBODIMENTS

Figure 1:
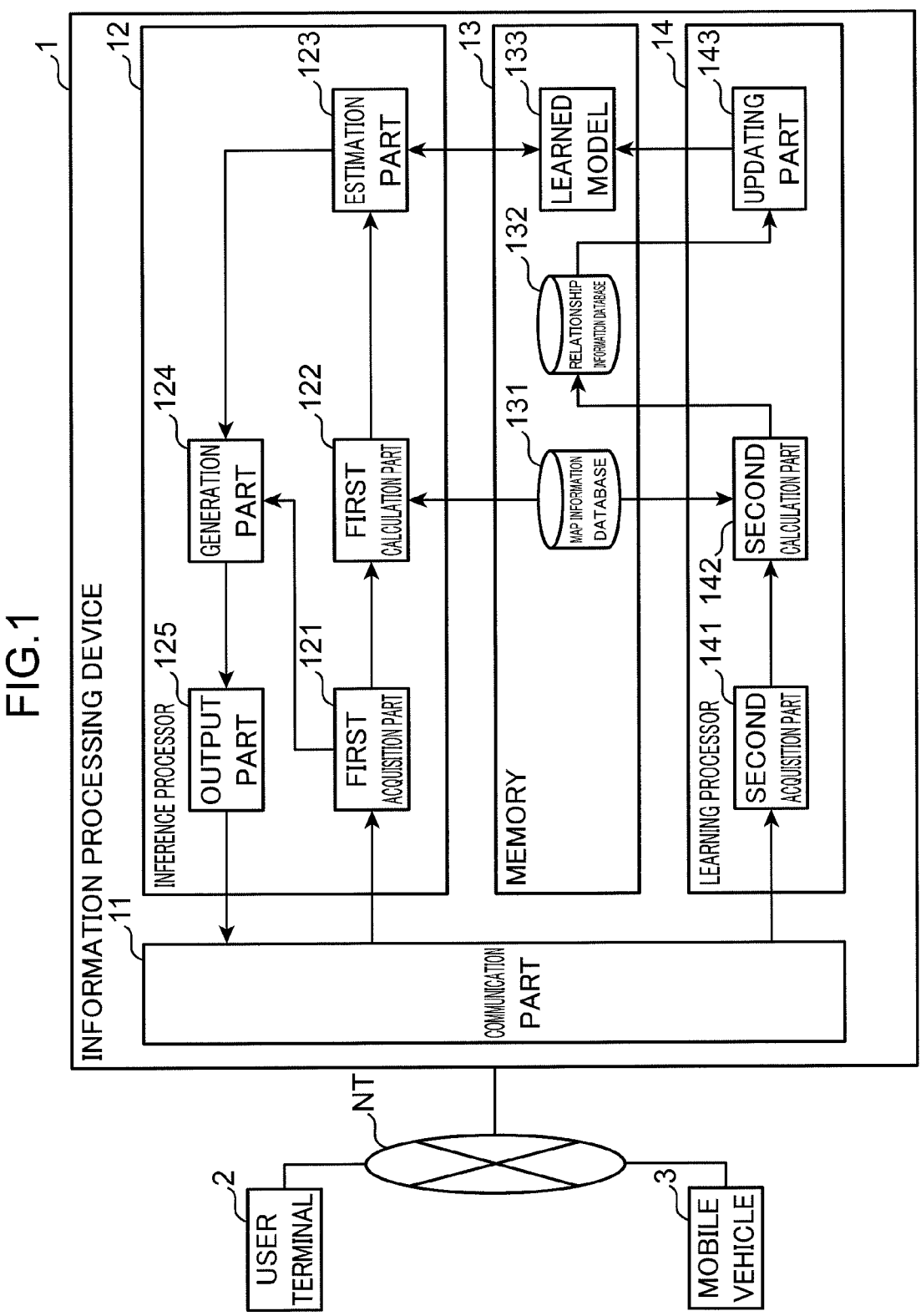
FIG. 1 is a block diagram showing an example of a configuration of an information processing device in a first embodiment of the present disclosure.

Knowledge Forming the Basis of the Present Disclosure

An electrically driven mobile vehicle, such as an electric vehicle, has a shorter traveling distance than a gas-powered vehicle or petrol vehicle, and thus needs displaying of a travelable area from a current location on a map image. Meanwhile, the performance of the electrically driven mobile vehicle chronologically changes, and the travelling distance thereof chronologically changes in accordance with the change in the performance.

However, such a conventional technology as the technology of Patent Literature 1 has a drawback that the calculation of the travelable area on the rule basis faces difficulty in being flexible with the change in the performance of the electrically driven mobile vehicle, resulting in failing to generate travelable area information accurately indicating a travelable area.

This disclosure has been achieved to solve the drawback described above.

(1) An information processing method is an information processing method for an information processing device that causes a display device to display a travelable area for an electrically driven mobile vehicle. The information processing method includes: by a processor included in the information processing device, acquiring input data including a current location and a residual electric power amount of the electrically driven mobile vehicle; calculating, on the basis of map information, a geographical feature quantity between the current location and a plurality of locations; calculating an estimative electric power consumptive amount of the electrically driven mobile vehicle from the current location to each of the locations by inputting the geographical feature quantity into a learned model obtained by machine learning of a relationship between: a geographical feature quantity between two locations; and an electric power consumption amount having been consumed to travel between the two locations; generating, on the basis of the estimative electric power consumptive amount for each of the locations and the residual electric power amount, travelable area information indicating the travelable area for the electrically driven mobile vehicle from the current location; and outputting the travelable area information to the display device.

This configuration adopts a learned model obtained by machine learning of a relationship between: a geographical feature quantity between two locations; and an electric power consumption amount having been consumed to travel between the two locations, and thus enables acquisition of traveling history data of the electrically driven mobile vehicle as needed and updating of the learned model by using the acquired traveling history data as needed. The configuration hence enables updating of the learned model suitably for the latest performance of the electrically driven mobile vehicle, and accurate calculation of an estimative electric power consumptive amount from the current location to each of the locations. This results in achieving generation of travelable area information accurately indicating a travelable area.

The configuration further permits the information processing device to calculate a geographical feature quantity between the current location and each of the locations, and thus eliminates the time and effort for the display device to calculate the geographical feature quantity and attains a reduction in a processing cost of the display device. Besides, the electrically driven mobile vehicle has no need to provide traveling history data including the geographical feature quantity, and thus can easily provide the traveling history data. Consequently, an environment for providing a larger amount of traveling history data is prepared to easily generate a learned model suitable for the latest performance of the electrically driven mobile vehicle.

(2) In the information processing method according to (1) above, the geographical feature quantity may include a distance between the two locations.

This configuration adopting the distance between the two locations as the geographical feature quantity enables more accurate calculation of the estimative electric power consumptive amount.

(3) In the information processing method according to (1) or (2) above, the geographical feature quantity may further include at least one of an elevation difference and the number of intersections between the two locations.

This configuration further using, as the geographical feature quantity, at least one of the elevation difference and the number of intersections between the two locations enables more accurate calculation of the estimative electric power consumptive amount.

(4) In the information processing method according to any one of (1) to (3), the learned model may be obtained by further machine learning of a relationship between: at least one of user identification information, vehicle information about the electrically driven mobile vehicle, battery information about a battery mounted on the electrically driven mobile vehicle, and date and time information indicating a traveling date and time; and the electric power consumption amount, and the input data may further include at least one of the user identification information, the vehicle information, the battery information, and the date and time information.

In this configuration, the input data further including at least one of the user identification information, the vehicle information, the battery information, and the date and time information is input into the learned model having performed machine learning by using a relationship between: at least one of the user identification information, the vehicle information, the battery information, and the date and time information; and the electric power consumption amount. The configuration thus enables calculation of an estimative electric power consumptive amount in accordance with at least one of the user identification information, the vehicle information, the battery information, and the date and time information.

(5) In the information processing method according to any one of (1) to (4) above, in the generating, travelability to each of the locations may be determined, and the travelable area information may include a map image displaying each of the locations in a display manner associated with the travelability.

This configuration includes displaying the map image in a display manner associated with a travelable area for each of the locations, and thus allows the user to easily confirm the travelable area.

(6) In the information processing method according to (5) above, the map image may display a location for which the residual electric power amount is equal to or larger than the estimative electric power consumptive amount in a display manner indicative of being travelable, and display a location for which the residual electric power amount is smaller than the estimative electric power consumptive amount in a display manner indicative of being untravellable.

This configuration includes displaying a location for which the residual electric power amount is equal to or larger than an estimative electric power consumptive amount in a display manner indicative of being travelable, and displays a location for which the residual electric power amount is smaller than the estimative electric power consumptive amount in a display manner indicative of being untravellable. This enables binary displaying of the travelability on the map image.

(7) In the information processing method according to (5) or (6) above, the map image may display a route from the current location to a travelable location.

This configuration enables presentation of a route to a travelable location to the user.

(8) In the information processing method according to any one of (5) to (7) above, the travelability may have a larger value as a ratio of the residual electric power amount to the estimative electric power consumptive amount is greater.

This configuration shows a larger value as a ratio of the residual electric power amount to the estimative electric power consumptive amount is greater, and thus allows the map image to display the travelability to each location at a continuous value.

(9) In the information processing method according to any one of (1) to (4) above, the travelable area information may include a map image displaying a boundary of the travelable area.

This configuration including the map image displaying the boundary of the travelable area allows the user to easily grasp the travelable area.

(10) In the information processing method according to (9) above, the learned model may further calculate a reliable section dependable on the estimative electric power consumptive amount, and the boundary may have a width and a density at least one of which is changed in accordance with the reliable section.

This configuration includes changing at least one of the width and the density in accordance with the reliable section, and thus allows the user to grasp an accuracy of estimating the travelable area.

(11) In the information processing method according to (9) or (10) above, the boundary may include an outer borderline and an inner borderline, the outer borderline may connect locations for which an upper limit of a reliable section dependable on the estimative electric power consumptive amount to ensure first reliability is the residual electric power amount, and the inner borderline may connect locations for which an upper limit of a reliable section dependable on the estimative electric power consumptive amount to ensure second reliability which is higher than the first reliability is the residual electric power amount.

This configuration includes displaying the boundary by using the outer borderline connecting locations for which un upper limit of a reliable section dependable on the estimative electric power consumptive amount to ensure the first reliability is the residual electric power amount, and the inner borderline connecting locations for which an upper limit of a reliable section dependable on the estimative electric power consumptive amount to ensure the second reliability which is higher than the first reliability is the residual electric power amount. This configuration thus enables expression of the boundary having the width dependable on the reliability

(12) The information processing method according to any one of (1) to (11) above may further include: acquiring, from the electrically driven mobile vehicle, traveling history data including a departure location, a destination location, and an electric power consumption amount having been consumed to travel from the departure location to the destination location; calculating, on the basis of the map information, a geographical feature quantity between the departure location and the destination location included in the traveling history data; and updating the learned model by using the geographical feature quantity and the electric power consumption amount included in the traveling history data.

This configuration includes: calculating a geographical feature quantity from the traveling history data including the departure location, the destination location, and the power consumption amount having been consumed to travel from the departure location to the destination location; and updating the learned model by using the relationship between the calculated geographical feature quantity and the power consumption amount. The configuration thus can reflect the latest performance of the electrically driven mobile vehicle in the learned model.

(13) In the information processing method according to any one of (1) to (12) above, the input data may include a display range of a map image to be displayed on the display device, and the locations may fall within the display range.

In this configuration, the locations fall within the map image displayed on the display device, and thus, the configuration can avoid calculating a geographical feature quantity at each location which is not displayed in the map image.

(14) An information processing device according to another aspect of the disclosure is an information processing device that causes a display device to display a travelable area for an electrically driven mobile vehicle. The information processing apparatus includes: an acquisition part that acquires input data including a current location and a residual electric power amount of the electrically driven mobile vehicle; a calculation part that calculates, on the basis of map information, a geographical feature quantity between the current location and a plurality of locations; an estimation part that calculates an estimative electric power consumptive amount of the electrically driven mobile vehicle from the current location to each of the locations by inputting the geographical feature quantity into a learned model obtained by machine learning of a relationship between: a geographical feature quantity between two locations; and an electric power consumption amount having been consumed to travel between the two locations; a generation part that generates, on the basis of the estimative electric power consumptive amount for each of the locations and the residual electric power amount, travelable area information indicating the travelable area for the electrically driven mobile vehicle from the current location; and an output part that outputs the travelable area information.

With this configuration, it is possible to provide an information processing device that exerts operational effects equivalent to those of the information processing method described above.

(15) An information processing program according to still another aspect of the disclosure is an information processing program for causing a computer to execute an information processing method of causing a display device to display a travelable area for an electrically driven mobile vehicle. The information processing program causes the computer to execute: acquiring input data including a current location and a residual electric power amount of the electrically driven mobile vehicle; calculating, on the basis of map information, a geographical feature quantity between the current location and a plurality of locations; calculating an estimative electric power consumptive amount of the electrically driven mobile vehicle from the current location to each of the locations by inputting the geographical feature quantity into a learned model obtained by machine learning of a relationship between: a geographical feature quantity between two locations; and an electric power consumption amount having been consumed to travel between the two locations; generating, on the basis of the estimative electric power consumptive amount for each of the locations and the residual electric power amount, travelable area information indicating the travelable area for the electrically driven mobile vehicle from the current location; and outputting the travelable area information.

With this configuration, it is possible to provide an information processing device that exerts operational effects equivalent to those of the information processing method described above.

(16) A method for producing a learned model according to further another aspect of the disclosure includes: causing a computer to execute: acquiring, from an electrically driven mobile vehicle, traveling history data including a departure location, a destination location, and an electric power consumption amount having been consumed to travel from the departure location to the destination location; calculating, on the basis of map information, a geographical feature quantity between the departure location and the destination location; and generating a learned model by machine learning of a relationship between the geographical feature quantity and the electric power consumption amount.

This configuration includes: calculating a geographical feature quantity from the traveling history data including the departure location, the destination location, and the power consumption amount having been consumed to travel from the departure location to the destination location; and updating the learned model by using the relationship between the calculated geographical feature quantity and the power consumption amount. The configuration thus can reflect the latest performance of the electrically driven mobile vehicle in the learned model.

This disclosure can be realized as an information updating system caused to operate by the information processing program as well. Additionally, it goes without saying that the computer program is distributable as a non-transitory computer readable storage medium like a CD-ROM, or distributable via a communication network like the Internet. Besides, a learning device and a learning program each realizing the method for producing the learned model in the disclosure may be provided. Moreover, it goes without saying that the learning program is distributable as a non-transitory computer readable storage medium, or distributable via a communication network like the Internet.

Each of the embodiments which will be described below represents a specific example of the disclosure. Numeric values, shapes, constituent elements, steps, and the order of the steps described below in each embodiment are mere examples, and thus should not be construed to delimit the disclosure. Moreover, constituent elements which are not recited in the independent claims each showing the broadest concept among the constituent elements in the embodiments are described as selectable constituent elements. The respective contents are combinable with each other in all the embodiments.

First Embodiment

FIG. 1 is a block diagram showing an example of a configuration of an information processing device 1 in a first embodiment of the disclosure. The information processing device 1 are communicably connected to a user terminal 2, which is an example of a display device, and a mobile vehicle 3 via a network NT. The network NT includes, for example, a wide area network having the internet and a mobile phone communication network. FIG. 1 illustrates one user terminal 2 and one single mobile vehicle 3, but a plurality of user terminals and a plurality of mobile vehicles may be included. Each of the user terminal 2 and the mobile vehicle 3 may be uniquely specified by a communication address.

The user terminal 2 is a portable information processing device, e.g., a tablet-type computer and a smartphone. The user terminal 2 is, for example, carried by a user who is in the mobile vehicle 3. The mobile vehicle 3 is, for example, an electrically driven mobile vehicle. The electrically driven mobile vehicle represents a mobile vehicle travelable with a power source using electric power. The electrically driven mobile vehicle includes a motor, a battery that supplies electric power to the motor, an inverter that controls the motor, and a display that displays a map image. Examples of the electrically driven mobile vehicle include an electric vehicle, an electric scooter, an electric bicycle, an electric kick scooter, and other vehicle. In the description below, the mobile vehicle is defined as an electric vehicle. The battery is a chargeable secondary battery, e.g., a lithium-ion battery, a nickel-metal hydride battery, or other secondary battery.

The user terminal 2 transmits, to the information processing device 1, input data to send an inquiry to the information processing device about a travelable area from the current location. The information processing device 1 having received the input data generates travelable area information indicating the travelable area from the current location, and transmits the generated travelable area information to the user terminal 2.

The mobile vehicle 3 comes into a travelable state when a power source thereof is turned on. The mobile vehicle 3 transmits the traveling history data to the information processing device 1 when the power source is turned off at a finish of the traveling. The information processing device 1 updates a learned model for calculating an estimative electric power consumptive amount by using the received traveling history data. The traveling history data may be transmitted to the information processing device 1 via the user terminal 2. In this case, the user terminal 2 and the mobile vehicle 3 are connected to each other via a wireless near field communication.

Next, the configuration of the information processing device 1 will be described in detail. The information processing device 1 includes a communication part 11, an inference processor 12, a memory 13, and a learning processor 14. The communication part 11 includes a communication circuit for connecting the information processing device 1 to the network NT. The communication part 11 receives input data from the user terminal 2 and transmits travelable area information to the user terminal 2. The communication part 11 further receives traveling history data from the mobile vehicle 3.

The inference processor 12 includes, for example, a central processing unit, and has a first acquisition part 121, a first calculation part 122, an estimation part 123, a generation part 124, and an output part 125. Each of the first acquisition part 121 to the output part 125 comes into effect when the central processing unit executes a predetermined information processing program. However, this is just an example, and each of the first acquisition part 121 to the output part 125 may be established in the form of a dedicated electric circuit, such as the ASIC.

The first acquisition part 121 acquires input data transmitted from the user terminal 2 by using the communication part 11. The input data includes: a current location and a residual electric power amount of the mobile vehicle 3; and a display range. The current location shows position information including a latitude and a longitude. The current location may further include an elevation of the mobile vehicle 3. The residual electric power amount represents a current residual electric power amount of the battery of the mobile vehicle 3. The display range represents information indicating a range of the map image to be displayed on the user terminal 2. The display range includes, for example, the current location, position information about an upper left (or upper right) point on the map image displayed on the user terminal 2, and position information about a lower right (or lower left) point on the image. The position information includes a latitude and a longitude. The display range is changed on the basis of a manipulation amount of a pinching-out manipulation or a pinching-in manipulation by a user onto the map image displayed on the user terminal 2.

The input data may further include additional information. The additional information includes at least one of user identification information, vehicle information about the mobile vehicle 3, battery information about a battery mounted on the mobile vehicle 3, and date and time information.

The user identification information includes information indicating features of the user, e.g., an identifier (user ID), a weight, a gender, an age, and a height of the user. The vehicle information includes information indicating features of the vehicle, e.g., a kind of the vehicle, an identifier of the mobile vehicle 3 (mobile vehicle ID), and a weight of the mobile vehicle 3. The battery information includes information indicating features of the battery, e.g., an identifier of the battery (battery ID), a kind of the battery, and a capacity of the battery. The date and time information includes information indicating a used date and time at which the mobile vehicle 3 is used, i.e., the date and time at which input data is input. The date and time information includes, for example, a year, a month, a date, a day of week, and a timeframe. The timeframe may include a transmission time for the input data, or may represent information indicating a timeframe including the transmission time for the input data, such as, a morning timeframe and an afternoon timeframe. The information indicating the timeframe may include information indicating a timeframe resulting from dividing twenty-four hours by a predetermined time period, such as a timeframe from one o'clock to two o'clock, and a timeframe from two o'clock to three o'clock.

The first calculation part 122 calculates, on the basis of map information stored in a map information database 131, a geographical feature quantity between the current location and a plurality of locations, and inputs the calculated feature quantity into the estimation part 123. The map information includes information indicating a map by using a plurality of nodes and a plurality of links connecting the nodes to each other. Each node shows position information indicating a characteristic position on a road. Examples of the characteristic position include an intersection on the road and an end location on the road. Each link represents a road.

Each of the locations is a predefined location falling within a map region indicated by the display range included in the input data, and corresponds to, for example, a main node among nodes included in the map information. When the locations include, for example, locations P1, P2, and P3 and the current location is defined as P0, the geographical feature quantity between the current location and the locations means each of three geographical feature quantities between P0 and P1, between P0 and P2, and between P0 and P3. In this case, the three geographical feature quantities are input into the estimation part 123.

The first calculation part 122 may calculate, as the geographical feature quantity, a distance of the shortest route or path between the current location and each of the locations by using, for example, a known path search or retrieval algorithm. Examples of the known path search algorithm include the Dijkstra's algorithm. The shortest route is, for example, a route which needs a lowest cost. However, this is just an example, and the first calculation part 122 may calculate the geographical feature quantity between the current location and each of the locations by using an external map API (Application Programming Interface). The first calculation part 122 may further calculate the geographical feature quantity between the current location and each of the locations by referring to a geographical feature quantity database storing a geographical feature quantity between each of a plurality of main nodes set in advance and another reachable node. The algorithm for calculating the geographical feature quantity is described in detail in the following literature, "Takuya AKIBA, Yoichi IWATA, and Yuichi YOSHIDA (March 2014), 2Hop raberu no chokuset-suteki na keisan niyoru gurafu saitan keiro kueri shori no kouritsuka [Improved efficiency of graph shortest path query processing by direct calculation of 2Hop rabel], DEIM Forum 2014, Retrieved from URL: https://db-event.jpn.org/deim2014/final/proceedings/A8-3.pdf.

The geographical feature quantity may further include at least one of an elevation difference and the number of intersections. The elevation difference may be an acquired elevation or may be a cumulative elevation on a route connecting the current location and each of the locations. The acquired elevation indicates an elevation difference from a highest location to the current location on the route. The cumulative elevation indicates a total value of elevation differences between ups or downs on the route.

The estimation part 123 calculates an estimative electric power consumptive amount of the mobile vehicle 3 from the current location to each of the locations by inputting a geographical feature quantity into the learned model 133, and inputs the calculated estimative electric power consumptive amount for each location into the generation part 124. The learned model 133 is obtained by machine learning of a relationship between: the geographical feature quantity between two locations; and a power consumption amount having been consumed to travel between the two locations. The learned model 133 will be described in detail later. The two locations mean a departure location and a destination location traveled by the mobile vehicle 3 in past.

For instance, in a case of inputting three geographical feature quantities between the locations P0 and P1, between the locations P0 and P2, and between the locations P0 and P3, the estimation part 123 sequentially inputs the geographical feature quantities between the locations P0 and P1, between the locations P0 and P2, and between the locations P0 and P3 into the learned model 133 to sequentially acquire estimative electric power consumptive amounts respectively for the location P1, the location P2, and the location P3 from the learned model 133, and inputs each acquired estimative electric power consumptive amount into the generation part 124 in association with a corresponding location ID.

The generation part 124 generates, on the basis of the estimative electric power consumptive amount for each of the locations calculated by the estimation part 123 and the residual electric power amount acquired by the first acquisition part 121, travelable area information indicating a travelable area for the mobile vehicle 3 from the current location.

The output part 125 transmits, by using the communication part 11, the travelable area information generated by the generation part 124 to the user terminal 2. The travelable area information indicates a travelable location for the mobile vehicle 3 within the display range on the user terminal 2, and the information includes, for example, a map image G1 shown in FIG. 4.

The memory 13 includes a non-volatile and rewritable storage device, such as a hard disk drive and a solid state drive. The memory 13 stores the map information database 131, a relationship information database 132, and the learned model 133. The map information database 131 stores the aforementioned map information. The relationship information database 132 stores relationship information to be used in machine learning and updating of the learned model 133. The relationship information associates a geographical feature quantity and a power consumption amount with each other. The learned model 133 is a machine learning model to be used by the estimation part 123 for calculating an estimative electric power consumptive amount.

The learning processor 14 includes, for example, a central processing unit, and has a second acquisition part 141, a second calculation part 142, and an updating part 143. Each of the second acquisition part 141 to the updating part 143 comes into effect when the central processing unit executes a predetermined information processing program. However, this is just an example, and each of the second acquisition part 141 to the updating part 143 may be established in the form of a dedicated electric circuit, such as the ASIC.

The second acquisition part 141 acquires, by using the communication part 11, traveling history data transmitted from the mobile vehicle 3. The traveling history data indicates a traveling history in one run of the mobile vehicle 3. The one run means a run of the mobile vehicle 3 from turning-on of a power source thereof to turning-off of the power source. The traveling history data includes, for example, a departure location, a destination location, and an electric power consumption amount of a battery having been consumed by the mobile vehicle 3 to travel from the departure location to the destination location. The departure location shows position information about the mobile vehicle 3 at a time of turning-on of the power source of the mobile vehicle 3. The destination location shows position information about the mobile vehicle 3 at a time of turning-off of the power source of the mobile vehicle 3. The position information includes a latitude and a longitude. The position information may further include an elevation difference between the departure location and the destination location.

The traveling history data may further include the above-described additional information in the same manner as the input data. It is noted here, however, that date and time information included in the traveling history data shows departure and arrival times. The departure and arrival times include a departure time at the departure location and an arrival time at the destination location.

The second calculation part 142 calculates, on the basis of the map information stored in the map information database 131, a geographical feature quantity between the departure location and the destination location included in the traveling history data acquired by the second acquisition part 141. The second calculation part 142 further associates the calculated geographical feature quantity with the power consumption amount included in the traveling history data to generate relationship information, and stores the generated relationship information in the relationship information database 132. The relationship information database 132 stores, for example, one piece of relationship information in association with one piece of traveling history data. When the traveling history data includes the additional information, the relationship information further includes the additional information in addition to the geographical feature quantity and the power consumption amount.

The updating part 143 updates the learned model 133 by using the relationship information. The updating part 143 may update the learned model 133 per predetermined period, or may update the learned model 133 per acquisition of a predetermined number of pieces of traveling history data. Examples of the predetermined period include one day, one week, and one month. Examples of the predetermined number of pieces include one, ten, 100, 1000, and another appropriate number. The updating of the learned model 133 will be described in detail in a third embodiment later.

The learned model 133 is a machine learning model obtained by machine learning of a relationship between a geographical feature quantity and a power consumption amount included in relationship information. For instance, the learned model 133 may be formed of any machine learning model as long as the machine learning model performs supervised learning. The machine learning model is, for example, a decision tree-based machine learning model like the random forest, a neural network, a linear regression model, or other model.

When the input data includes additional information, the learned model 133 further performs machine learning by using the additional information. In this case, the additional information is input into the learned model 133 in addition to the geographical feature quantity calculated by the first calculation part 122 so that an estimative electric power consumptive amount corresponding to the input geographical feature quantity and additional information is output.

Figure 2:
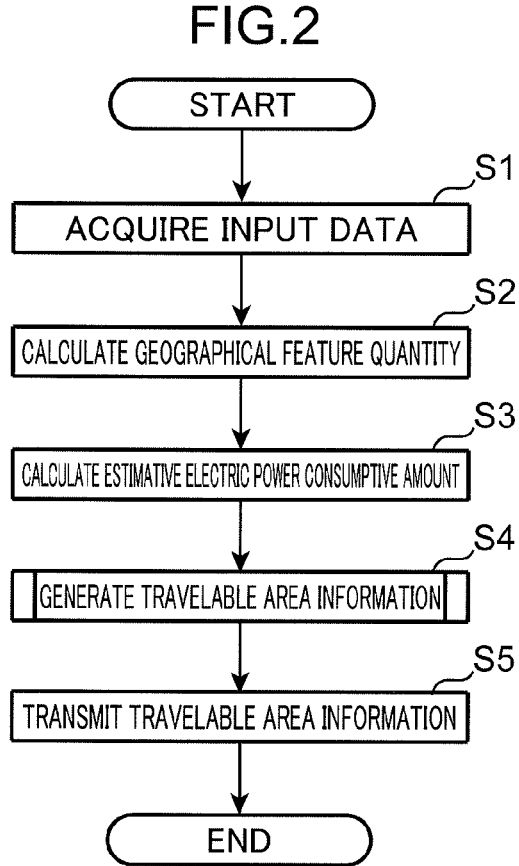
FIG. 2 is a flowchart showing an example of a process by the information processing device in the first embodiment of the disclosure.

Heretofore, the configuration of the information processing device 1 is described. Next, a process by the information processing device 1 will be described. FIG. 2 is a flowchart showing an example of the process by the information processing device 1 in the first embodiment.

In step S1, the first acquisition part 121 acquires, by using the communication part 11, input data transmitted from the user terminal 2. In step S2, the first calculation part 122 specifies, on the basis of map information, a plurality of locations falling within a map region indicated by a display range from a current location and the display range included in input data, and calculates a geographical feature quantity between each of the specified locations and the current location with reference to the map information database 131.

In step S3, the estimation part 123 calculates an estimative electric power consumptive amount corresponding to the geographical feature quantity of each location by inputting the geographical feature quantity of each location calculated by the first calculation part 122 into the learned model 133. When the learned model 133 further performs machine learning by using additional information in addition to the geographical feature quantity, the estimation part 123 may calculate the estimative electric power consumptive amount for each location by inputting the additional information included in the input data into the learned model 133 in addition to the geographical feature quantity calculated by the first calculation part 122.

In step S4, the generation part 124 generates travelable area information on the basis of the estimative electric power consumptive amount for each of the locations calculated in step S3 and a residual electric power amount included in input data. Processing in step S4 will be described in detail later.

In step S5, the output part 125 transmits the travelable area information to the user terminal 2 by using the communication part 11.

Figure 3:
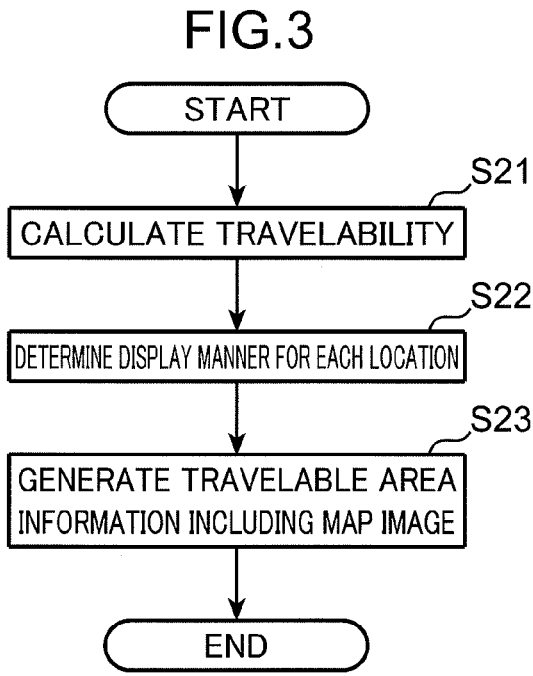
FIG. 3 is a flowchart showing an example of detailed processing in step S4 shown in FIG. 2 in the first embodiment.

FIG. 3 is a flowchart showing an example of detailed processing in step S4 shown in FIG. 2 in the first embodiment. In step S21, the generation part 124 calculates, on the basis of the estimative electric power consumptive amount and the residual electric power amount, travelability to each of the locations for which the estimative electric power consumptive amount is calculated. When the estimative electric power consumptive amount is defined as W1 and the residual electric power amount is defined as W0, the generation part 124 determines a location for which the residual electric power amount W0 is equal to or larger than the estimative electric power consumptive amount W1 (W0≥W1) as a travelable location, and determines a location for which the residual electric power amount W0 is smaller than the estimative electric power consumptive amount W1 (W0<W1) as an untravellable location. The generation part 124 may give a flag indicating "1" to the travelable location, and a flag indicating "0" to the untravellable location.

In step S22, the generation part 124 determines a display manner for each location. For instance, the generation part 124 sets a display manner for a travelable location to a first display manner indicative of being travelable, and sets a display manner for an untravellable location to a second display manner indicative of being untravellable.

In step S23, the generation part 124 generates a map image displaying the travelable location in the first display manner and displaying the untravellable location in the second display manner, and generates travelable area information including the generated map image. The generated map image here represents a map image having the display range included in the input data.

Figure 4:
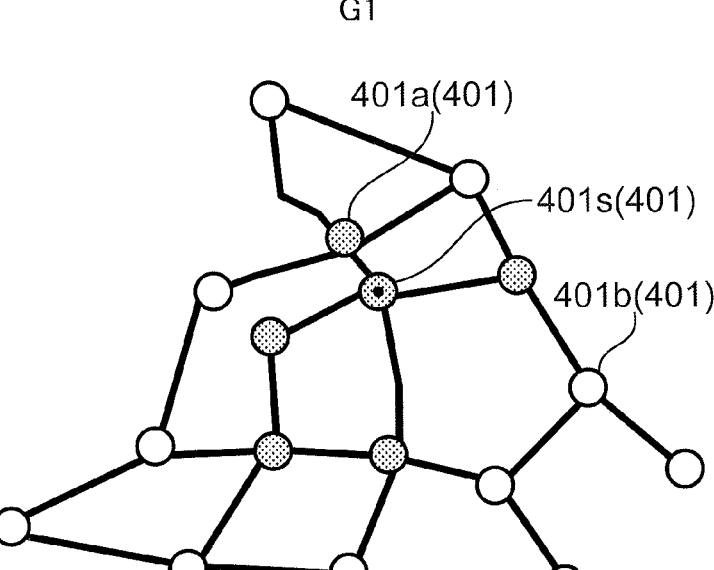
FIG. 4 is an illustration of a map image of a first example in the first embodiment.

FIG. 4 is an illustration of a map image G1 of a first example in the first embodiment. The map image G1 includes a plurality of locations 401. Each of the locations 401 represents a location for which a geographical feature quantity is calculated by the first calculation part 122. A location 401*s* denotes a current location. A location 401*a* denotes a travelable location. A location 401*b* denotes an untravellable location. The location 401*a* is displayed with, for example, a circular symbol having a first density (in the first display manner), and the location 401*b* is displayed with, for example, another circular symbol having a second density (in the second display manner). The second density is lower than the first density. This configuration allows a user to easily grasp a travelable area. Each of the first display manner and the second display manner may be any adoptable display manner as long as the display manner can distinguish the travelable location and the untravellable location from each other. For instance, the first display manner may be expressed in a circular shape, and the second display manner may be expressed in another shape, e.g., a triangular shape, a quadrangular shape, or other shape, which is different from the circular shape.

Figure 5:
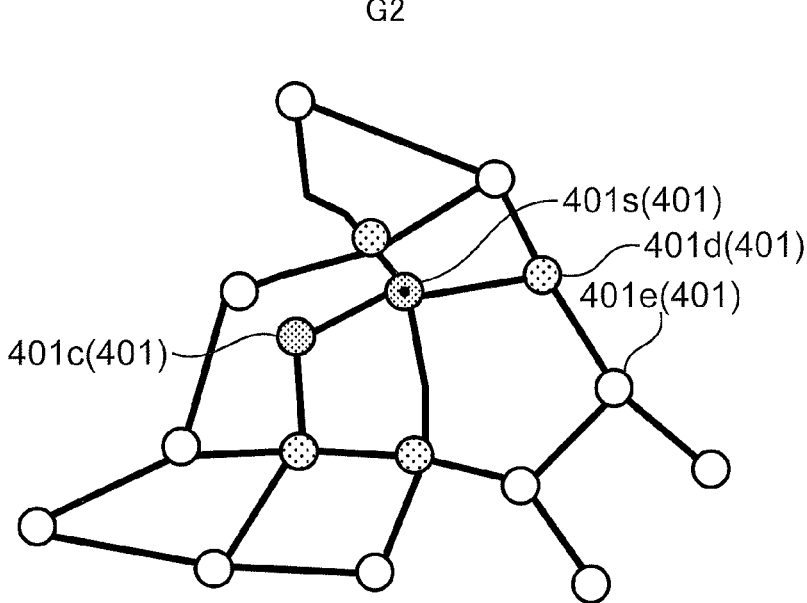
FIG. 5 is an illustration of a map image of a second example in the first embodiment.

FIG. 5 is an illustration of a map image G2 of a second example in the first embodiment. In the map image G2, each location 401 is displayed in a density associated with travelability thereto. In this case, the generation part 124 may calculate, in step S21, the travelability to have a larger value as a ratio of a residual electric power amount W0 to an estimative electric power consumptive amount W1 (W0/W1) is greater. Specifically, the generation part 124 may calculate the ratio (W0/W1), normalize the calculated ratio so that the ratio falls within a range from a minimum value 0 to a maximum value 1, and calculate the normalized value as the travelability. The generation part 124 may further determine the display manner for each location at a density associated with the travelability, and may display each location at the determined density on the map image. In this manner, the travelability to each location 401 is displayed at a continuous value.

For instance, a location 401*c* has higher travelability than a location 401*d*, and thus is displayed at a higher density than that of the location 401*d*. The location 401*d* has higher travelability than a location 401*e*, and thus is displayed at a higher density than that of the location 401*e*.

As described heretofore, the information processing device 1 in the embodiment adopts the learned model 133 obtained by machine learning of a relationship between: a geographical feature quantity between two locations; and an electric power consumption amount having been consumed to travel between the two locations, and thus enables acquisition of traveling history data of a mobile vehicle 3 as needed and updating of the learned model by using the acquired traveling history data as needed. The configuration enables updating of the learned model 133 suitably for the latest performance of the mobile vehicle 3, and accurate calculation of an estimative electric power consumptive amount from a current location to each location. This results in achieving generation of travelable area information accurately indicating a travelable area.

The configuration further permits the information processing device 1 to calculate a geographical feature quantity between the current location and each of the locations, and thus eliminates the time and effort for the user terminal 2 to calculate the geographical feature quantity and attains a reduction in a processing cost of the user terminal 2. Besides, the mobile vehicle 3 has no need to provide traveling history data including the geographical feature quantity, and thus can easily provide the traveling history data. Consequently, an environment for providing a larger amount of traveling history data is prepared to easily generate a learned model suitable for the latest performance of the electrically driven mobile vehicle.

Second Embodiment

The first embodiment is intended for displaying a map image displaying a location in a display manner associated with travelability thereto. A second embodiment is intended for generating a map image displaying a boundary of a travelable area. In the embodiment, constituent elements which are the same as those in the first embodiment are given the same reference numerals and signs. The second embodiment differs from the first embodiment in detailed processing in step S4 in FIG. 2.

Figure 6:
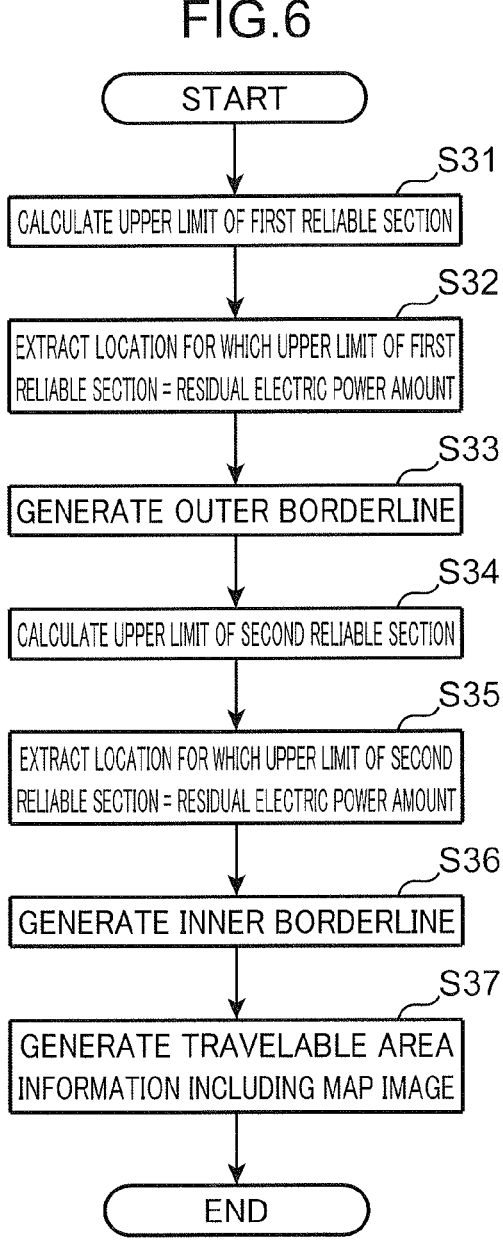
FIG. 6 is a flowchart showing an example of detailed processing in step S4 shown in FIG. 2 in a second embodiment.

FIG. 6 is a flowchart showing an example of detailed processing in step S4 shown in FIG. 2 in the second embodiment. It is noted here that a generalized linear model is adopted as a learned model 133 in the second embodiment. Under the circumstances, the learned model 133 is configured to output an estimative electric power consumptive amount, a reliability of the estimative electric power consumptive amount, and a reliable section dependable on the estimative electric power consumptive amount to ensure the reliability. In this regard, the generation part 124 receives, from an estimation part 123, an input of the estimative electric power consumptive amount, the reliability, and the reliable section for each of locations. The reliability includes first reliability and second reliability which is higher than the first reliability.

The reliable section represents such a range that a probability of a power consumption amount falling therein equals to relevant reliability, and includes a first reliable section in which the reliability indicates the first reliability and a second reliable section in which the reliability indicates the second reliability. The first reliability indicates, for example, 50%. However, this is just an example, and the first reliability may adopt an appropriate value, such as 50%, 40%, or other percentage. The second reliability is higher than the first reliability, e.g., 95%. However, this is just an example, and the second reliability may adopt an appropriate value, such as 80%, 90%, or other percentage, which is higher than the first reliability.

For instance, in a case where a residual electric power amount indicates 60 Wh with an loser limit of 0 Wh and an upper limit of 60 Wh in the first reliable section for a specific location, the probability to reach the location equals to the first reliability. That is, a residual amount of 80 Wh enables arrival at the specific location with the first reliability or higher. The second reliability is higher than the first reliability, and thus, the second reliable section has an upper limit which is higher than the upper limit of the first reliable section. A larger power consumption amount is generally required for a farther distant location from a departure location, and hence, an upper limit of each of the first reliable section and the second reliable section becomes larger as a distance from the departure location is longer. In this regard, a location for which an upper limit of the second reliable section reaches a certain power consumption amount is closer to the departure location than a location for which an upper limit of the first reliable section reaches the power consumption amount. As the accuracy by the learned model 133 is higher, the first reliable section and the second reliable section come closer to each other. This means that the two locations are close to each other.

In step S31, the estimation part 123 calculates an upper limit of a first reliable section dependable on an estimative electric power consumptive amount for each of the locations for which the corresponding estimative electric power consumptive amount is calculated.

In step S32, the generation part 124 extracts a location for which an upper limit of the first reliable section equals to a residual electric power amount. For instance, in a case where the residual electric power amount indicates 60 Wh, a location for which an upper limit of the first reliable section indicates 60 Wh is extracted.

In step S33, the generation part 124 generates an outer borderline of a boundary by connecting locations extracted in step S32. The outer borderline defines a range in which a probability of reaching with the residual electric power amount is equal to or higher than the first reliability.

In step S34, the estimation part 123 calculates an upper limit of a second reliable section for each of the locations for which the corresponding estimative electric power consumptive amount is calculated.

In step S35, the generation part 124 extracts a location for which the upper limit of the second reliable section equals to the residual electric power amount. For instance, in a case where the residual electric power amount indicates 100 Wh, a location for which an upper limit of the first reliable section indicates 100 Wh is extracted.

In step S36, the generation part 124 generates an inner borderline of the boundary by connecting locations extracted in step S35. The inner borderline defines a range in which a probability of reaching with the residual electric power amount is equal to or higher than the second reliability.

In step S37, the generation part 124 generates travelable area information including a map image displaying the outer borderline and the inner borderline.

Figure 7:
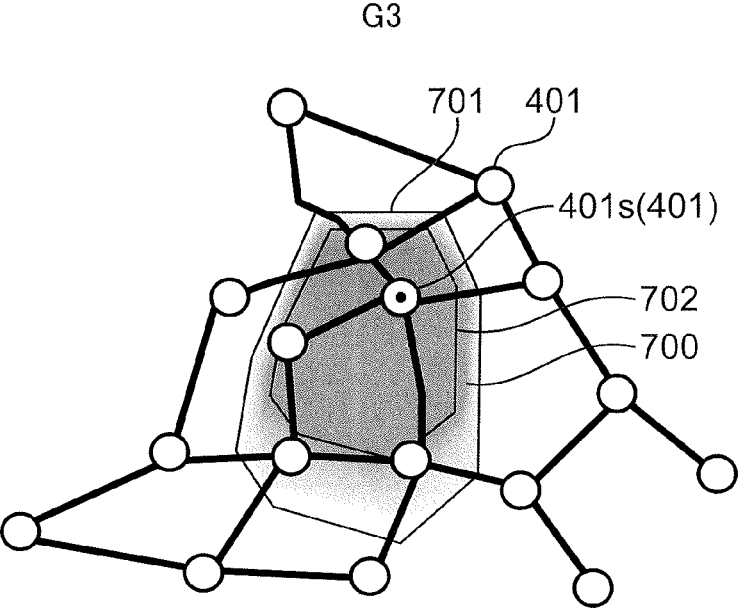
FIG. 7 is an illustration of a map image of a first example in the second embodiment.

FIG. 7 is an illustration of a map image G3 of a first example in the second embodiment. A boundary object 700 representing a boundary shows an image having a donut shape and defined by an outer borderline 701 and an inner borderline 702. The map image G3 only displays main locations 401 that are plotted, and omits illustration of locations connecting the outer borderline 701 and the inner borderline 702.

The outer borderline 701 connects locations for which the residual electric power amount is the upper limit of the first reliable section, and the inner borderline 702 connects locations for which the residual electric power amount is the upper limit of the second reliable section. It is seen from this perspective that a width between the outer borderline and the inner borderline is larger in a place where an estimation accuracy by the learned model 133 is lower. By contrast, the width between the outer borderline and the inner borderline is smaller in a place where an estimation accuracy by the learned model 133 is higher. The boundary object 700 allows a user to recognize a place with a higher estimation accuracy of an estimative electric power consumptive amount and a place with a lower estimation accuracy of an estimative electric power consumptive amount in accordance with a width between the outer borderline 701 and the inner borderline 702.

The generation part 124 further generates the boundary object 700 to have a higher density in a place closer to the inner borderline 702 and a lower density in a place closer to the outer borderline 701. In this manner, in the boundary object 700, the density more rapidly changes in a place with a smaller width between the outer borderline 701 and the inner borderline 702, and the density more gently changes in a place with a larger width between the borderlines. Consequently, the boundary object allows the user to more easily recognize a place with a higher estimation accuracy of an estimative electric power consumptive amount and a place with a lower estimation accuracy of the estimative electric power consumptive amount. In the example in FIG. 7, the generation part 124 generates the map image G3 displaying a higher density inside the inner borderline 702 than the density of the boundary object 700.

Figure 8:
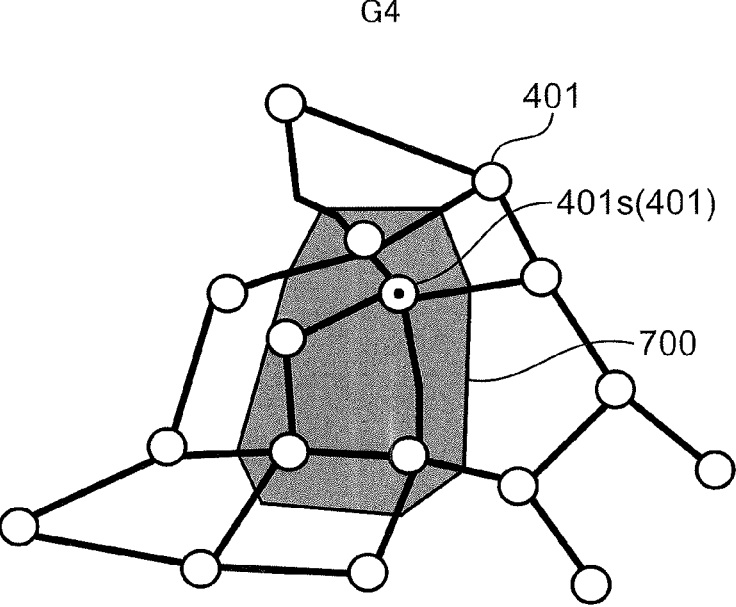
FIG. 8 is an illustration of a map image of a second example in the second embodiment.

FIG. 8 is an illustration of a map image G4 of a second example in the second embodiment. The map image G4 includes a boundary object 700 generated in the same manner as that in the map image G3. However, the map image G4 entirely has a smaller difference between a location for which a residual electric power amount is an upper limit of a first reliable section and a location for which a residual electric power amount is an upper limit of a second reliable section than the difference seen in the map image G3. Thus, the width of the boundary object 700 in the map image G4 is smaller than the width of the boundary object 700 in the map image G3.

Figure 9:
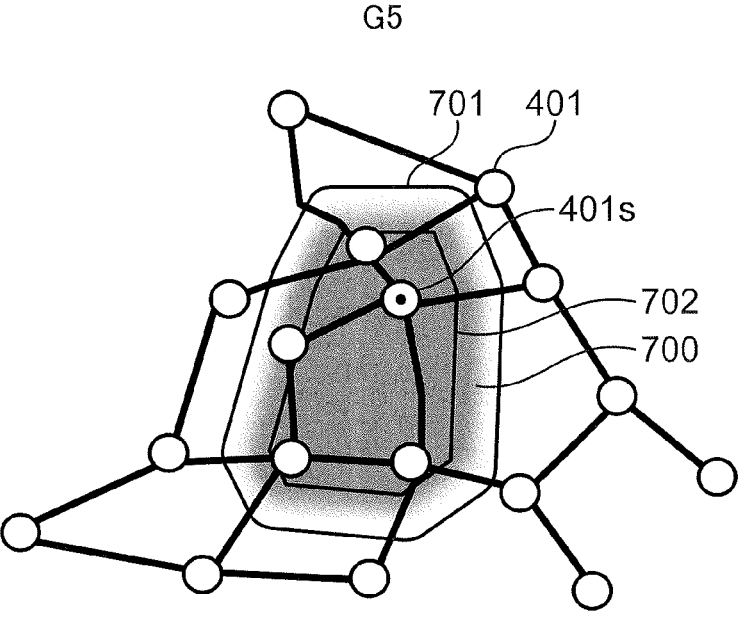
FIG. 9 is an illustration of a map image of the second example in the second embodiment.

FIG. 9 is an illustration of a map image G5 of a second example in the second embodiment. The map image G5 includes a boundary object 700 generated in the same manner as that in each of the map images G3, G4. The map image G5 has a larger difference between a location for which a residual electric power amount is an upper limit of a first reliable section and a location for which a residual electric power amount is an upper limit of a second reliable section than the difference seen in the map image G4, but the difference is entirely uniform. Thus, the boundary object 700 in the map image G5 has a uniform width.

According to the second embodiment, the boundary object 700 has a width and a density each of which is changeable in accordance with an accuracy by the learned model 133. This allows the user to grasp an accuracy of estimating a travelable area.

Third Embodiment

Figure 10:
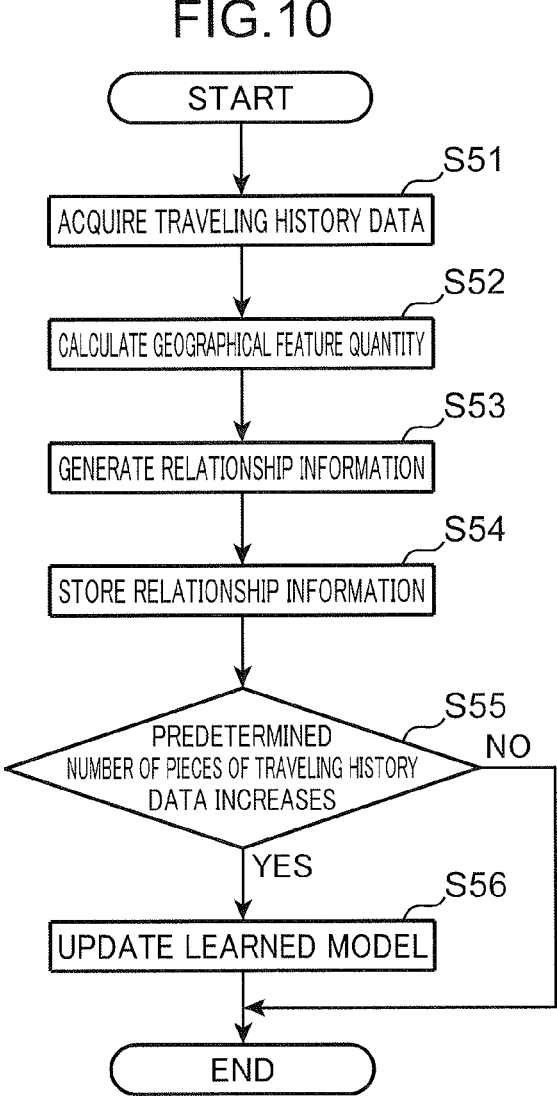
FIG. 10 is a flowchart showing an example of a process by an information processing device in performance of machine learning in a third embodiment of the disclosure.

An information processing device 1 in a third embodiment is intended for updating a learned model 133. In the third embodiment, constituent elements which are the same as those in the first embodiment are given the same reference numerals and signs, and thus explanation therefor will be omitted. FIG. 10 is a flowchart showing an example of a process by the information processing device 1 in performance of machine learning in the third embodiment. The flowchart is executed, for example, per acquisition of traveling history data.

In step S51, a second acquisition part 141 acquires, by using a communication part 11, traveling history data transmitted by a mobile vehicle 3.

In step S52, a second calculation part 142 calculates, on the basis of map information stored in a map information database 131, a geographical feature quantity between a departure location and a destination location included in the traveling history data.

In step S53, the second calculation part 142 associates the geographical feature quantity calculated in step S52 with a power consumption amount included in the traveling history data to generate relationship information. When the traveling history data includes additional information, the relationship information further includes the additional information in addition to the geographical feature quantity and the power consumption amount.

In step S54, the second calculation part 142 stores the relationship information in a relationship information database 132.

In step S55, an updating part 143 determines whether the number of pieces of traveling history data acquired by the second acquisition part 141 increases by a predetermined number from previous updating of the learned model 133. When it is determined that the number of pieces of traveling history data increases by the predetermined number (YES in step S55), the updating part 143 updates the learned model 133 by using the increased pieces of relationship information (step S56). In this case, the updating part 143 updates the learned model 133 by machine learning of the learned model 133 in such a manner as to output a power consumption amount corresponding to a geographical feature quantity included in the relationship information when the geographical feature quantity is input into the model. When the relationship information includes additional information, the updating part 143 may cause the learned model 133 to perform machine learning so that a corresponding power consumption amount is output in response to an input of the geographical feature quantity and the additional information.

When it is determined that the number of pieces of traveling history data does not increase by the predetermined number (NO in step S55), the process is finished.

As described heretofore, the information processing apparatus 1 in the third embodiment updates the learned model 133 by using the relationship information, and accordingly, can reflect the latest performance of a mobile vehicle 3 in the learned model 133.

Modifications (1) Although input data includes a display range in the embodiment, the present disclosure is not limited thereto, and the input data may not include the display range. In this case, the first calculation part 122 may calculate a geographical feature quantity of a location falling within a predetermined range from the current location.

(2) In the first embodiment, each of the map images G1, G2 may display a route from a current location to a travelable location. In this case, the generation part 124 may retrieve or search a shortest route from the current location to the travelable location by using a known path search algorithm, and display the shortest route on each of the map image G1, G2.

INDUSTRIAL APPLICABILITY

The present disclosure achieves accurate displaying of a travelable area, and thus is usefully applicable to an electrically driven mobile vehicle.

The invention claimed is:

1. An information processing method for an information processing device that causes a display device to display a travelable area for an electrically driven mobile vehicle, the information processing method comprising:

by a processor included in the information processing device:

acquiring input data including a current location and a residual electric power amount of the electrically driven mobile vehicle;

calculating, based on map information, a first geographical feature quantity between the current location and a plurality of locations;

calculating an estimative electric power consumptive amount of the electrically driven mobile vehicle from the current location to each of the plurality of locations by inputting the first geographical feature quantity into a learned model obtained by machine learning of a relationship between: a second geographical feature quantity between two locations; and an electric power consumption amount having been consumed to travel between the two locations;

generating, based on the estimative electric power consumptive amount for each of the plurality of locations and the residual electric power amount, travelable area information indicating the travelable area for the electrically driven mobile vehicle from the current location; and outputting the travelable area information to the display device, wherein the travelable area information includes a map image displaying a boundary of the travelable area, the learned model further calculates a reliable section dependable on the estimative electric power consumptive amount, and the boundary includes a width and a density at least one of which is changed in accordance with the reliable section.

2. The information processing method according to claim 1, wherein the second geographical feature quantity includes a distance between the two locations.

3. The information processing method according to claim 1, wherein the second geographical feature quantity further includes at least one of an elevation difference or a number of intersections between the two locations.

4. The information processing method according to claim 1, wherein the learned model is obtained by further machine learning of a second relationship between: at least one of user identification information, vehicle information about the electrically driven mobile vehicle, battery information about a battery mounted on the electrically driven mobile vehicle, or date and time information indicating a traveling date and time of the electrically driven mobile vehicle and the electric power consumption amount, and the input data further includes the at least one of the user identification information, the vehicle information, the battery information, or the date and time information.

5. The information processing method according to claim 1, wherein, in the generating, travelability to each of the plurality of locations is determined, and the travelable area information includes the map image displaying each of the plurality of locations in a display manner associated with the travelability.

6. The information processing method according to claim 5, wherein the map image displays a first location for which the residual electric power amount is equal to or larger than the estimative electric power consumptive amount in a first display manner indicative of being travelable, and displays a second location for which the residual electric power amount is smaller than the estimative electric power consumptive amount in a second display manner indicative of being untravellable.

7. The information processing method according to claim 5, wherein the map image displays a route from the current location to a travelable location.

8. The information processing method according to claim 5, wherein the travelability has a larger value as a ratio of the residual electric power amount to the estimative electric power consumptive amount is greater.

9. The information processing method according to claim 1, further comprising:

acquiring, from the electrically driven mobile vehicle, traveling history data including a departure location, a destination location, and an electric power consumption amount having been consumed to travel from the departure location to the destination location;

calculating, based on the map information, a third geographical feature quantity between the departure location and the destination location included in the traveling history data; and updating the learned model by using the third geographical feature quantity and the electric power consumption amount included in the traveling history data.

10. The information processing method according to claim 1, wherein the input data includes a display range of the map image to be displayed on the display device, and the plurality of locations fall within the display range.

11. The information processing method according to claim 1, wherein the boundary includes an outer borderline and an inner borderline, the outer borderline connects locations for which a first upper limit of a first reliable section dependable on the estimative electric power consumptive amount to ensure first reliability is the residual electric power amount, and the inner borderline connects locations for which a second upper limit of a second reliable section dependable on the estimative electric power consumptive amount to ensure second reliability which is higher than the first reliability is the residual electric power amount.

12. An information processing device that causes a display device to display a travelable area for an electrically driven mobile vehicle, the information processing device comprising:

a processor, wherein the processor is configured to execute:

acquiring input data including a current location and a residual electric power amount of the electrically driven mobile vehicle;

calculating, based on the basis of map information, a first geographical feature quantity between the current location and a plurality of locations;

calculating an estimative electric power consumptive amount of the electrically driven mobile vehicle from the current location to each of the plurality of locations by inputting the first geographical feature quantity into a learned model obtained by machine learning of a relationship between: a second geographical feature quantity between two locations; and an electric power consumption amount having been consumed to travel between the two locations;

generating, based on the estimative electric power consumptive amount for each of the plurality of locations and the residual electric power amount, travelable area information indicating the travelable area for the electrically driven mobile vehicle from the current location; and outputting the travelable area information to the display device, wherein the travelable area information includes a map image displaying a boundary of the travelable area, the learned model further calculates a reliable section dependable on the estimative electric power consumptive amount, and the boundary includes a width and a density at least one of which is changed in accordance with the reliable section.

13. A non-transitory computer readable recording medium storing an information processing program for causing a computer to execute an information processing method of causing a display device to display a travelable area for an electrically driven mobile vehicle, the information processing program comprising:

causing the computer to execute:

acquiring input data including a current location and a residual electric power amount of the electrically driven mobile vehicle;

calculating, based on map information, a first geographical feature quantity between the current location and a plurality of locations;

calculating an estimative electric power consumptive amount of the electrically driven mobile vehicle from the current location to each of the plurality of locations by inputting the first geographical feature quantity into a learned model obtained by machine learning of a relationship between: a second geographical feature quantity between two locations; and an electric power consumption amount having been consumed to travel between the two locations;

generating, based on the estimative electric power consumptive amount for each of the plurality of locations and the residual electric power amount, travelable area information indicating the travelable area for the electrically driven mobile vehicle from the current location; and outputting the travelable area information to the display device, wherein the travelable area information includes a map image displaying a boundary of the travelable area, the learned model further calculates a reliable section dependable on the estimative electric power consumptive amount, and the boundary includes a width and a density at least one of which is changed in accordance with the reliable section.

* * * * *